United States Patent
Gregory

(10) Patent No.: US 10,051,974 B2
(45) Date of Patent: Aug. 21, 2018

(54) TEXTILE CLIP

(71) Applicant: Fastmount Limited, Waimauku (NZ)

(72) Inventor: John Kelly Gregory, Waimauku (NZ)

(73) Assignee: Fastmount Limited, Waimauku (NZ)

( * ) Notice: Subject to any disclaimer, the term of this patent is extended or adjusted under 35 U.S.C. 154(b) by 0 days.

(21) Appl. No.: 15/299,049

(22) Filed: Oct. 20, 2016

(65) Prior Publication Data

US 2017/0127848 A1    May 11, 2017

(51) Int. Cl.
   *A47C 31/02*      (2006.01)
   *A47C 7/02*       (2006.01)
   *A44B 17/00*      (2006.01)

(52) U.S. Cl.
   CPC ........ *A47C 31/023* (2013.01); *A44B 17/0017* (2013.01); *A47C 7/021* (2013.01); *A47C 31/026* (2013.01)

(58) Field of Classification Search
   CPC ..... A74C 31/023; A74C 31/026; A47C 7/021; A44B 17/0017
   See application file for complete search history.

(56) References Cited

U.S. PATENT DOCUMENTS 6,761,411 B2 *   7/2004   Boehmer ............. B60N 2/5825
                                                           297/440.22

* cited by examiner

*Primary Examiner* — Robert Sandy
(74) *Attorney, Agent, or Firm* — Studebaker & Brackett PC

(57) ABSTRACT

Presented is a releasable clip assembly operable to secure a cushion to a supporting surface, the assembly having a male component which is received in a first axis in a chassis of a female component. The clip assembly also has one or more engagement elements configurable into an open configuration to admit the male component and operable to return to a closed configuration to engage the received male component to secure it in the chassis, and one or more release elements operable when actuated transversely to the first axis to allow the engagement elements to be configured in the open configuration to release the male component.

14 Claims, 9 Drawing Sheets

TEXTILE CLIP

CROSS-REFERENCE TO RELATED APPLICATIONS

This application claims the benefit of priority to Australian Patent Application No. 2015904314, filed Oct. 21, 2015, which is hereby incorporated in its entirety including all tables, figures and claims.

FIELD OF THE INVENTION

This invention relates to improvements in respect of clips for textiles, such as clips for removable anchoring of cushions to supporting structures, such as clips for securing cushions to seating structures in maritime environments, and such as clips for securing squabs specifically.

BACKGROUND OF THE INVENTION

Cushions or squabs are well-known to the reader as used to provide cushioning for seating structures. Use of squabs is common for maritime, building and recreational vehicle seating, among others.

Squabs typically have cushioning material covered by a fabric. Squabs are often positively secured to the structure to keep them in place as the seating structure moves. Further, squabs are often aligned with other squabs to provide a contiguous soft covering of a hard seating structure. The requirement to positively secure a squab or cushion presents technical challenges, particularly when a fabric covering of the squab is involved. This challenge is exacerbated by the need for a device which secures the squab to not protrude significantly, so as to not degrade the comfort of the cushioning effect of the squab.

Squabs are commonly used in maritime environments where they need to be removed for maritime conditions such as high winds or rough weather.

Recent trends in maritime design have larger numbers of squabs used and the squabs may need to be removed quickly.

A common requirement to release a squab quickly can exacerbate the challenge of positively securing a cushion.

It would therefore be of advantage to have a squab clip which addresses the challenges of securing squabs, or at least provides the public with an alternative choice.

DISCLOSURE OF THE INVENTION

In one aspect the present invention provides a releasable clip assembly operable to secure a cushion to a supporting surface, the assembly comprising: a male component which is received in a first axis in a chassis of a female component; the clip assembly comprising one or more engagement elements configurable into an open configuration to admit the male component and operable to return to a closed configuration to engage the received male component to secure it in the chassis, and one or more release elements operable when actuated transversely to the first axis to allow the engagement elements to be configured in the open configuration to release the male component.

The clip assembly may comprise two or more engagement elements each connected to a common release element such that actuation of the release element allows movement of the two or more engagement elements into the open configuration.

The one or more of the one or more release elements may extend from the chassis to receive an actuation force external to the chassis. An engagement element may comprise a flexible element connected between two release elements so as to be configurable into the open configuration by bowing towards a periphery of the chassis under actuation of a release element. A flexible element may be resilient and biased towards the closed configuration. A flexible, resilient element may be operable to bias the one or more release elements to return after actuation to an original position. A release element may comprise a button which is operable to be actuated by a digit of a hand.

The female component may comprise three release elements and three engagement elements. The release elements may be located at positions spaced evenly about the chassis. The release elements may be operable to locate the engagement elements with respect to the chassis. The release elements may be operable to locate the engagement elements in the chassis.

The male component may be received in the chassis of a female component through a chassis opening and wherein the engagement elements in the closed configuration partially obstruct the chassis opening to define a partially obstructed opening which is narrower than that the chassis opening.

The chassis of the female component may be shorter in the first axis than the diameter of the chassis opening.

The male component may comprise one or more engagement recesses to receive the one or more engagement elements when the engagement elements are in the closed configuration.

The clip male component may comprise a tapered leading end to allow the male component to cause the one or more flexible elements to flex to the open configuration as the male component is received into the through the opening in the chassis to provide a push through connection of the male component.

The clip assembly may comprise a flange connected to the chassis and the flange may be operable to be affixed to a cushion to affix the chassis to the cushion. A flange may have formed therein one or more tracks of material sufficiently thin to facilitate sewing through the track. The clip may comprise a flange connected to the male component and operable to be affixed to a squab to affix the male component to the squab.

BRIEF DESCRIPTION OF THE DRAWINGS

Additional and further aspects of the present invention will be apparent to the reader from the following description of embodiments, given in by way of example only, with reference to the accompanying drawings in which.

Further aspects of the invention will become apparent from the following description of the invention which is given by way of example only of particular embodiments.

BEST MODES FOR CARRYING OUT THE INVENTION

Figure 1:
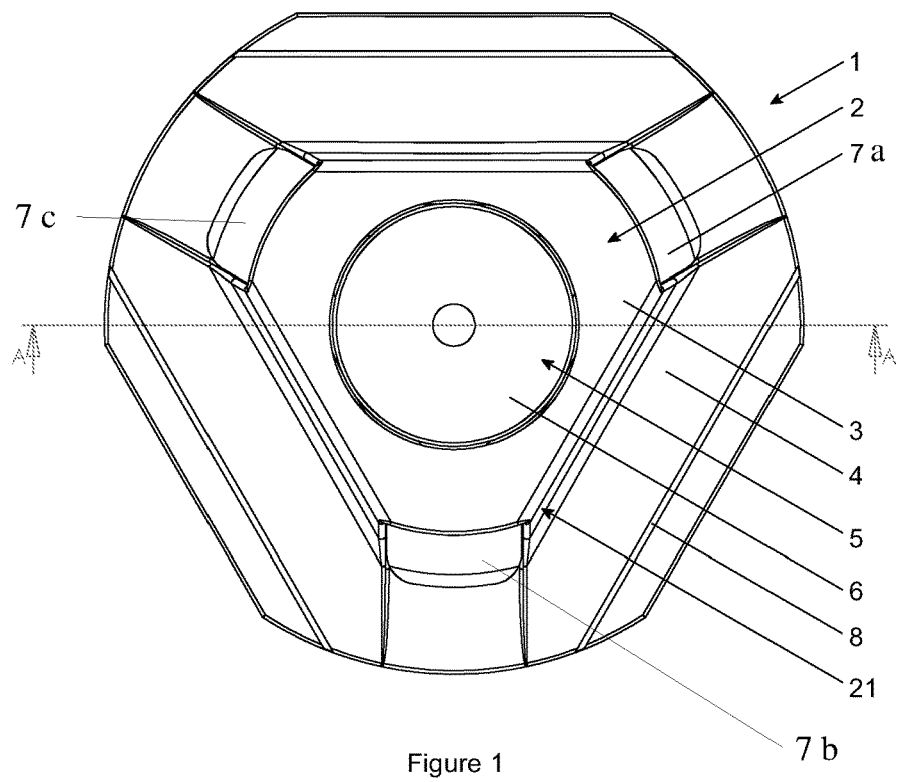
FIG. 1 shows a top view of a clip assembly according to a preferred embodiment of the present invention, the first part having a chassis, flanged, release buttons and engagement elements (not visible)

FIG. 1 gives a top view of clip assembly 1 according to a preferred embodiment of the present invention. The clip assembly is adapted to secure a cushion or squab (not shown in FIG. 1) to a supporting substrate or structure and to release to release the secured squab or cushion. This particular embodiment is adapted to provide a low-profile means to secure a seating squab so as to not interfere with the cushioning effect of the squab.

A female component 2 of the clip assembly 1 has a chassis 3 which is provided with a flange 4 for affixing the chassis to a squab (not shown). A chassis opening 5 allows a male component 6 to be received in the chassis 3.

The female component 2 has a release button 7 which is capable of being actuated from outside and at the side of the chassis 3 in towards the centre of the chassis 3 and the chassis opening 5. The release button 7 extends from the chassis 3. A number of release buttons 7 are arranged about the female component 2.

The flange 4 is provided with affixation features 8 which allow the flange to be affixed to a squab.

Figure 2:
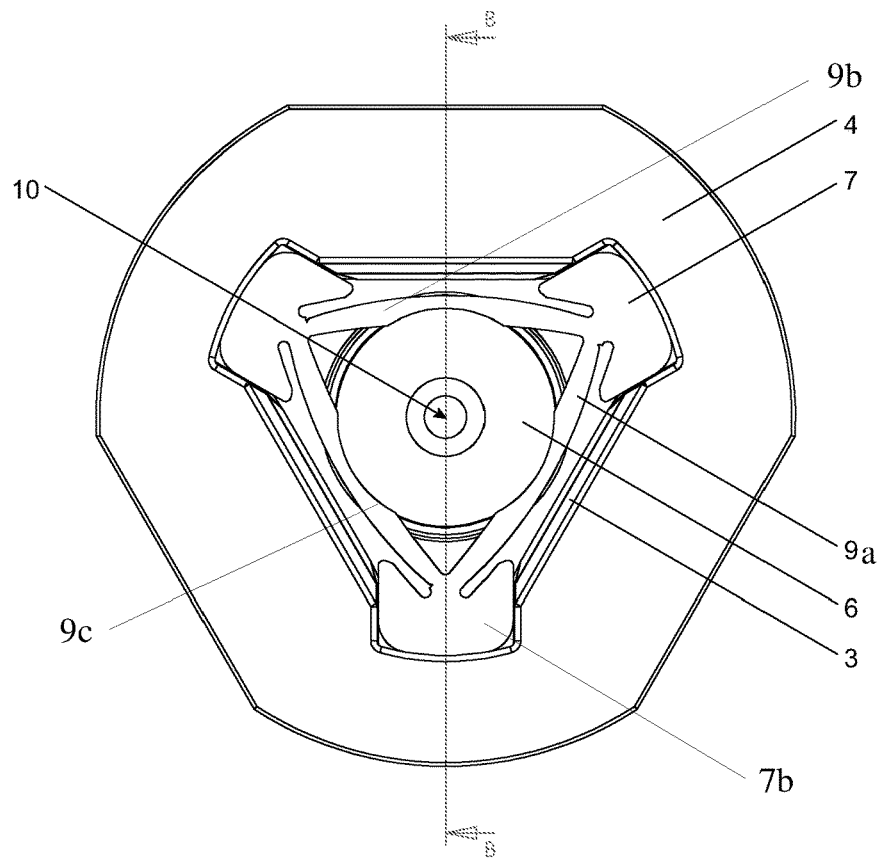
FIG. 2 shows an underside view of the clip assembly shown in FIG. 1, with the engagement elements of a first, female part shown engaging a second, male part of the clip assembly comprising a male element.

FIG. 2 shows a bottom view of the squab clip assembly 1. Release buttons 7a to 7c are shown extending through the chassis 3. Engagement elements 9 are shown connecting release buttons 7a to 7c. The engagement elements 9 are resilient. In this example the engagement elements are formed of filaments or springs.

In FIG. 2, the engagement elements 9 are shown in a closed configuration. In the closed configuration the engagement elements engage a recess (not visible in FIG. 2) formed in the periphery of the male component 6. It is apparent from FIG. 2 that an end of the male component 6, shown extending out of the page, has a cross-section which is broader or wider than an engagement opening defined by the set of engagement elements 9 shown when they are in a closed configuration. In this example shown in FIG. 2 the opening is wider than the cross-section of the male component 6. When in the closed configuration, engagement elements obstruct egress of the male component 6 from the chassis 3 through the chassis opening 5 when the engagement elements are in the closed configuration.

As shown in FIG. 2, engagement elements 9 are bowed or flexed outward and transversely from the centre of the chassis opening 5 and towards the periphery of the chassis. This is the case in this example, when the elements 9 are in the closed configuration as well as when they are in the open configuration. It will be apparent to the reader that the elements 9 bowed in the closed configuration would bow further, transversely and away from the centre of the chassis opening 5, when one or more of the release buttons 7a to 7c are actuated at the side of the chassis 3 towards the centre of the chassis.

In the example shown in FIG. 2, release buttons 7a to 7c arranged evenly separated by 120° around the chassis 3. In this embodiment the buttons 7 are suitable to be actuated by a digit of a hand.

As the engagement elements 9 are resilient and bowed, it will be apparent to the reader that they bias the release buttons 7 outwards towards an original, non-actuated position in which they extend from the periphery of the chassis 3. It will also be apparent that the actuation of one or more of the release buttons 7 acts to open and close and engagement opening formed by the elements 9. Alternatively, the action of the release buttons 7 and engagement elements 9 is to reconfigure engagement elements 9 between an open configuration when a button 7 is actuated inwards to actuate to connected engagement elements and a closed configuration when the resilient nature of the engagement elements 9 acts to bias and actuated button 7 outwards again.

In this example the resilient engagement elements are biases towards the closed configuration by the same mechanism by which they bias the buttons 7 outwards. The chassis 3 of this embodiment provides guides for movement of the buttons to move inwards and outwards with respect to the centre of the opening 5. This allows the buttons 7 to locate the engagement elements while allowing the engagement elements 9 to bow outwards so as to allow the engagement elements 9a to 9c to release the male component 6. Alternatively, apexes formed in this example by junctions 9a-9b, 9b-9c and 9c-9a between the engagement elements 9 are able to move inwards towards the centre of the opening 5 to release the male component 6. In this embodiment, any single one of the apexes can move inwards to a degree sufficient to release the male component 6.

Figure 3:
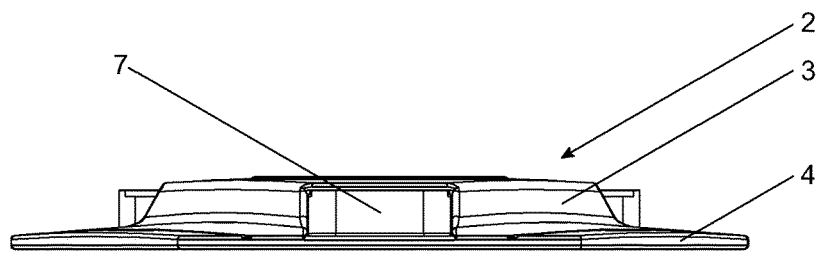
FIG. 3 shows a side view of the first part of the trip assembly shown in FIG. 1.

FIG. 3 shows a side-elevation view of the female component 2 of the clip assembly 1. As apparent from FIG. 3, the female component 2 has a low-profile, being wider than it is high by a number of times. In the example shown in FIG. 3 the component 2 is less than 1 cm high and approximately 5 cm wide. In the centre of the view of the component 2 is shown a release button 7a aligned in a direction out of the page. Also visible at either side of the component 2 are the sides of two additional release buttons 7b and 7c.

Figure 4:
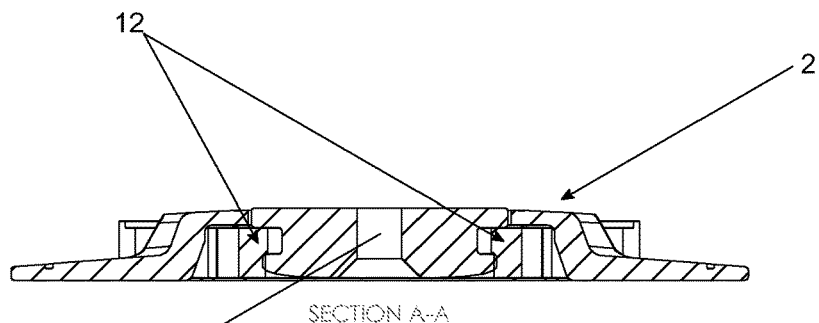
FIG. 4 shows a cutaway side view of a clip assembly according to the same embodiment of the invention as FIGS. 1 to 3.

FIG. 4 shows a cutaway side elevation revealing the internals of the female component 2 and a male component 6 received in the chassis 3. The cutaway is along line A-A shown in FIG. 1.

FIG. 4 shows the male component 6 received in the chassis 3 extending through the chassis opening. FIG. 4 also shows engagement recesses 12 into which engagement elements 9 are received to engage the component 6 and obstruct egress through the chassis opening.

The screw hole 10 shown in FIG. 4 is counter-sunk on the side of the male component 6 which approaches the female component 2. The leading edge of the male component 6, shown towards the bottom on the page, is shown slightly tapered to facilitate the male component 6 forcing engagement elements 9 transverse to the direction of entry of the male component 6 into the chassis 3 through the chassis opening 5.

Figure 5:
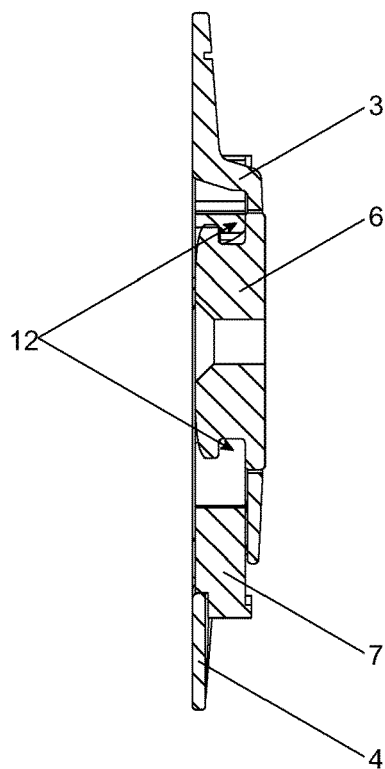
FIG. 5 shows a another cutaway side view of the clip assembly according to the same embodiment of the invention as FIGS. 1 to 4.

FIG. 5 shows an alternative side view, cutaway along line B-B of FIG. 2 to reveal internals of the female component 2 with male component 6.

Figure 6:
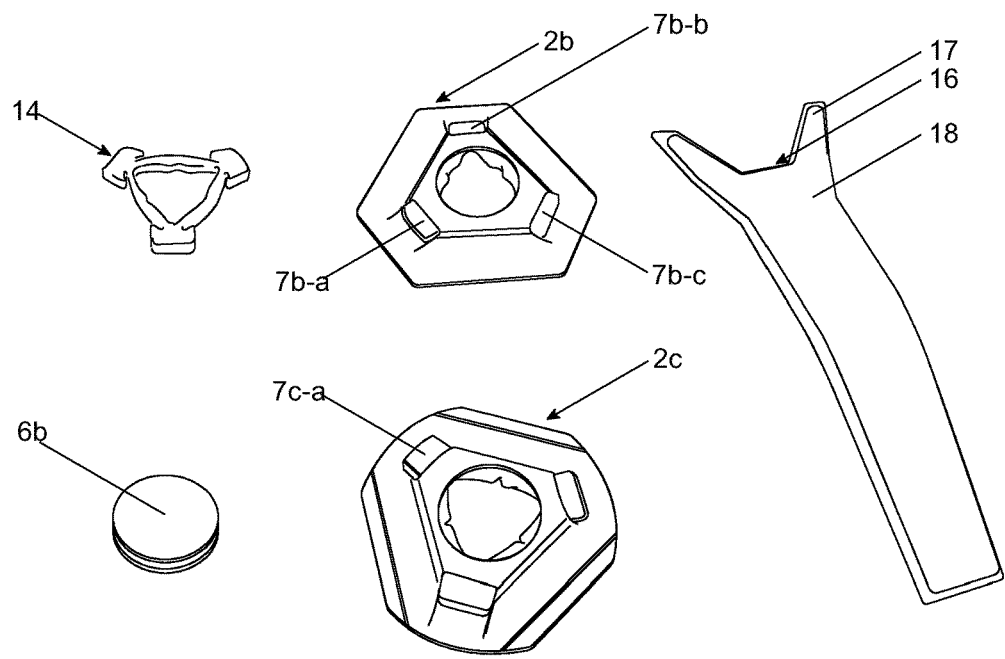
FIG. 6 shows an assortment of components of a clip assembly according to another embodiment of the present invention.

FIG. 6 shows an assortment of parts of the clip assembly one of various embodiments of the present invention. A female component 2b is shown with chassis 3b release buttons 7b-a to 7b-c. The example of the female clip component 2b shown in FIG. 6 has a flange 4 with relatively squared edges. The female component 2c shown in FIG. 6 has relatively rounded edges and has a track along each edge where the flange is thinner to facilitate sewing the flanged to fabric of a squab through the track.

Also shown in FIG. 6 is a button and engagement element sub-assembly 14, which shows the engagement elements 9 formed as slightly bowed and connecting release buttons 7. It is apparent that as the engagement elements are resilient they will act to bias, or spring-load, the release buttons outwards from the centre of the chassis 3 and tend to stay in their bowed closed configuration as shown in FIG. 6. It will also be apparent that forcing one of the release buttons 7 inwards will cause to connected engagement elements 9 to bow further outwards into an open configuration. This provides a means to actuate the engagement elements to release the male component 6 by an action at the side and external to the clip assembly 1, which facilitates the clip assembly having a low-profile to fit under a squab. It will be further apparent that as the engagement elements 9 in the closed configuration only slightly obstruct the chassis opening 5 and can therefore be forced into the open configuration by entry through the chassis opening 5 by the male component 6. This allows a snap-lock or clip function to be provided by the female component 2 for the male component 6.

FIG. 6 further shows a release tool 15 for use with the female component 2. The tool 15 has a button actuation surface 16 locators between two outwardly extending guide arms 17 which form a concave part. Adjacent to the button actuation surface 16 is a lifting surface 18. The guide arms 17 will act to align the button actuation surface 16 with a female component 2, and specifically with the centre of the component 2 where a release button 7 is located. The lifting surface 18 will act to lift a squab to which the female component 2 is a fixed upwards from a surface to which a male component 6 is a fixed to separate these once the button actuation surface 16 actuate is a button 7 to bow two engagement elements 9 transverse to the chassis opening 5 to disengage the engagement elements 9 from engagement recess provided in the male component 6. FIG. 6 also shows guide edges 21 located either side of the each button 7. The guide edges 21 guide the arms 17 of the release tool to facilitate alignment of the actuation surface 16 with a button.

Figure 7:
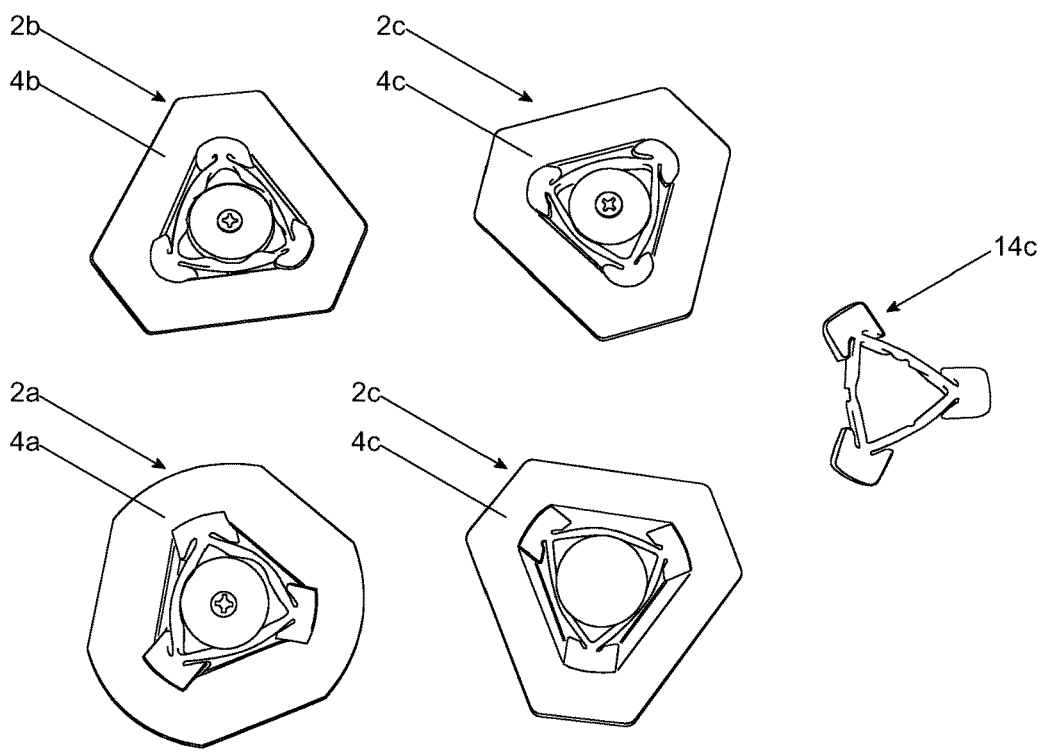
FIG. 7 shows an alternative assortment of clip assemblies components of a clip assembly according to the same embodiment as FIG. 6.

FIG. 7 shows further alternative shapes for flange 4a to 4d according to various embodiments of the present invention.

Figure 8:
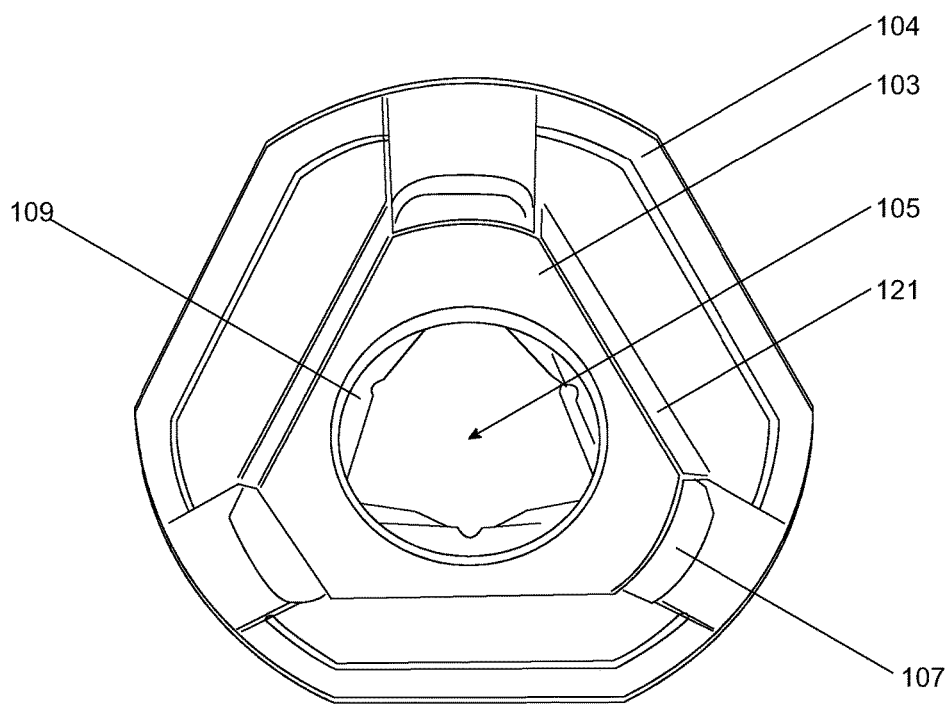
FIG. 8 shows a first part of a clip assembly according to the same embodiment as FIGS. 6 and 7, this first, female part comprising a chassis, flange, release buttons and engagement elements (not visible)

FIG. 8 shows another example of a female component 102 according to an alternative embodiment of the present invention. A male component is not shown in FIG. 8. As is apparent in FIG. 8, engagement elements 109 extend through the edge of the chassis opening 105, cutting off arcs such that the engagement elements 109 could be forced transverse and outwards from the chassis opening 105 by a male component 6 or by actuation by a button 107.

Figure 9:
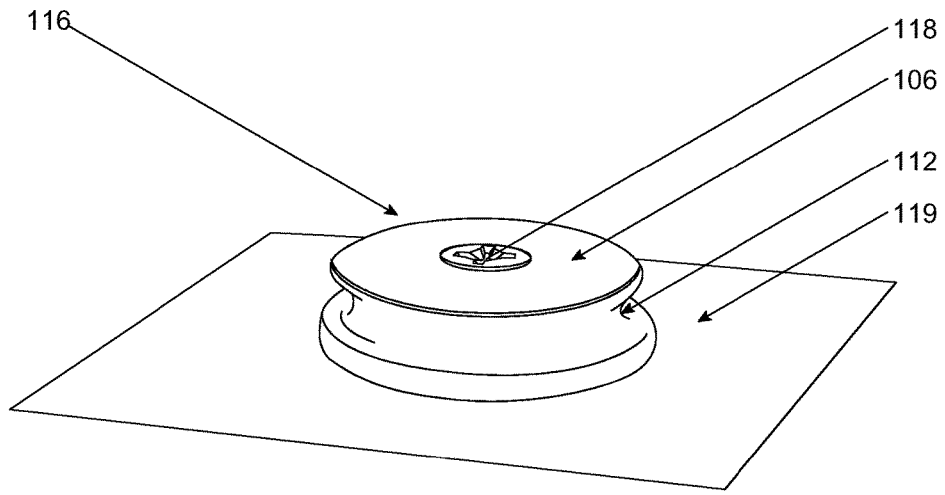
FIG. 9 shows a second part of a clip assembly according to the same embodiment as FIGS. 6 to 8, this second part comprising a male component.

FIG. 9 shows a male component 106 affixed with a screw 118 to a squab-mounting surface or substrate 119. FIG. 9 also shows the engagement recess 112 and tapered end 116 of the male component 106.

Figure 10:
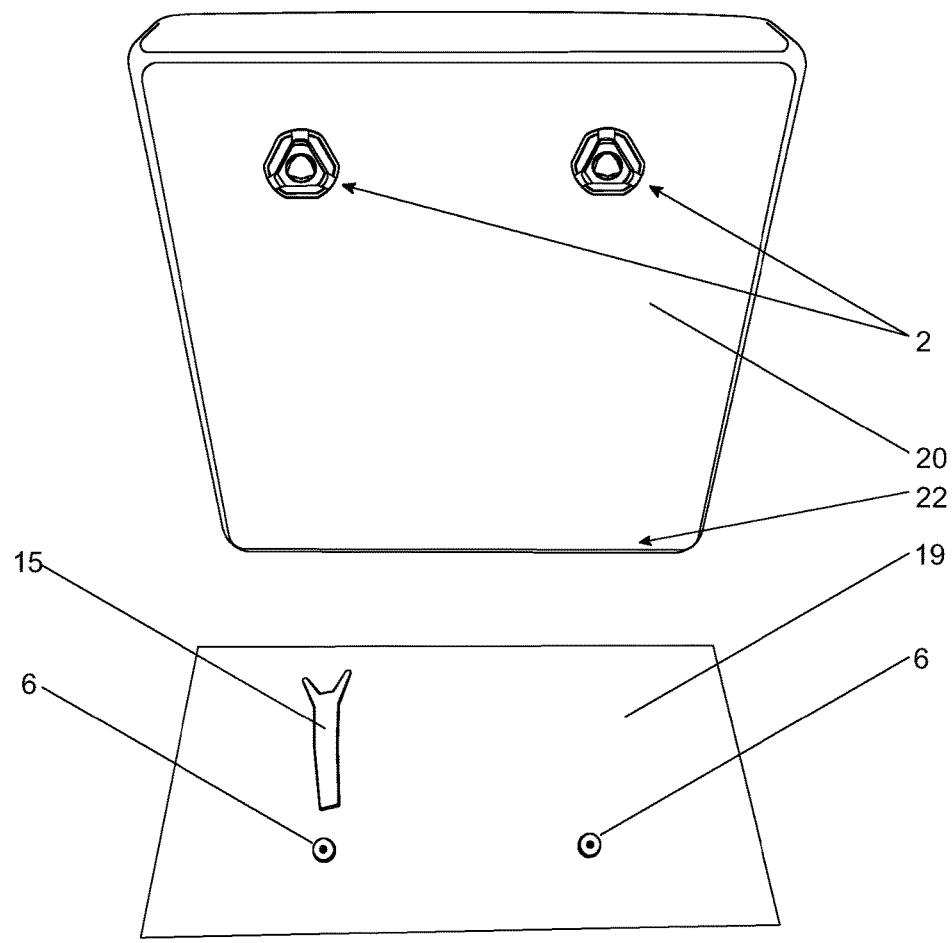
FIG. 10 shows a squab with a first part of a clip assembly according to the embodiment of FIGS. 6 to 9 affixed, and shows a second part of the clip assembly according to the embodiment of FIGS. 6 to 9 affixed to a surface to which the squab is to be secured, and also shows a tool used to release the squab from the surface.

FIG. 10 shows a squab 20 which might be connected at one edge 22 to a squab-mounting surface 19 with a flap of material (not shown). Affixed to fabric of the squab 20 are two female components 2. Affixed to the squab-mounting surface 19 are two male components 6. The male components are affixed in positions where they will contact and be received by female components 2 as the squab 20 is lowered towards the squab-mounting surface 19. Also shown is a tool 15 to assist releasing in the male component 6 from the female component 2 and lifting the squab 20 from the squab-mounting surface 19 to remove the male component 6 from the female component 2.

Figure 11:
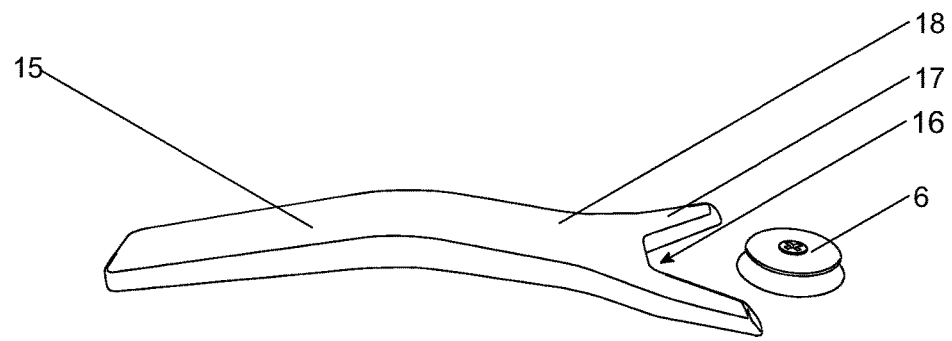
FIG. 11 shows a closer view of the tool and second part of a clip assembly according to the embodiment of FIGS. 6 to 10.

FIG. 11 illustrates the relationship between the tool 15 and male component 6.

A typical use scenario of an embodiment of the invention will now be described with reference to FIGS. 4 and 10.

To secure a squab 20 to a surface 19, the squab 20 is lowered so that female components to our directly above male component 6 with the component 6 aligned with the chassis opening 5. Typically, the diameter of the male component 6 is less by a defined tolerance than the diameter of a chassis opening 5. However, three arcs of the chassis opening are cut-off by engagement elements 9. The engagement elements 9 are forced outwards from the chassis opening 5 into an open configuration to admit the male component 6 into the chassis 3 through the now un-obstructed chassis opening 5 until the male component 6 is far enough into the chassis 3 to allow the engagement elements 9 to snap back to the closed configuration and into the engagement recess 12 to obstruct egress of the male component 6 from the chassis 3 to secure the male component 6 to the female component 2 and thereby to secure the squab 20 to the squab mounting surface 19 to which the male component 6 is affixed.

Figure 12:
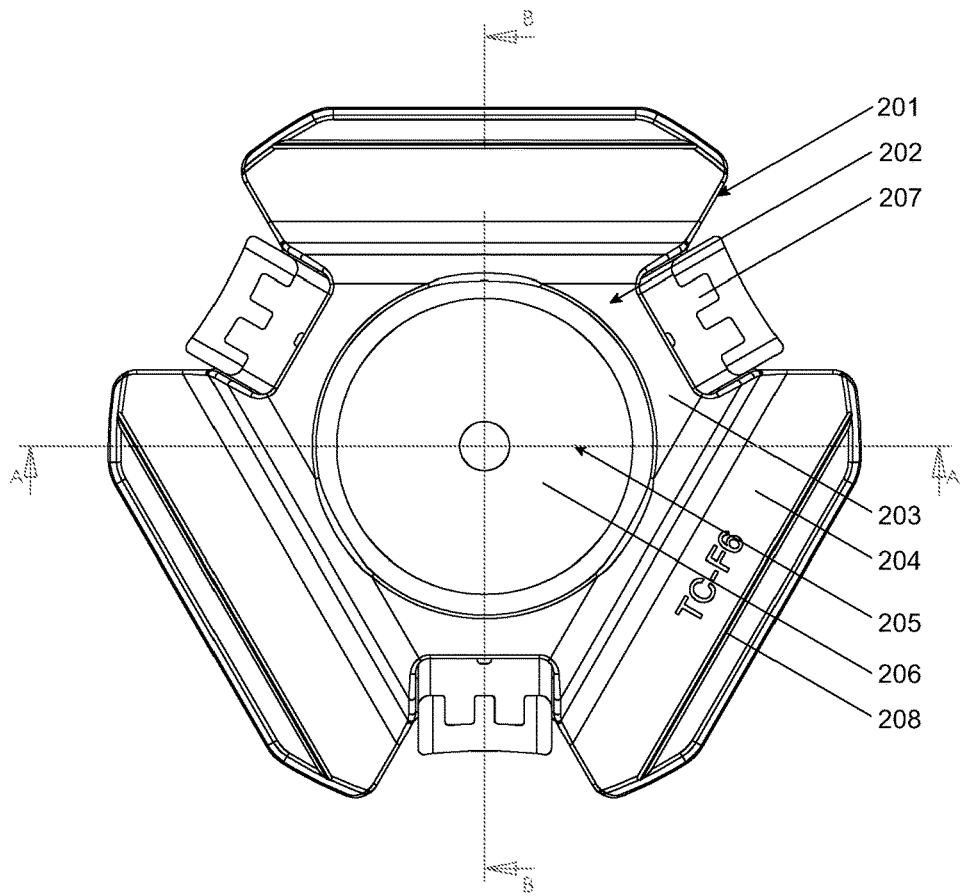
FIG. 12 shows a top view of a clip assembly according to a further alternative embodiment of the present invention.

To release the squab 20 from a surface 19, the tool 15 is slid between the squab 20 and surface 19 approximately towards the location of a clip component 1. As the guide arms 17 contact an outer surface of the chassis 3, and specifically the guide edges 21, the tool 17 is aligned with the chassis 3 so that the button actuation surface 16 contacts a release button 7. Force then applied to the tool 15 actuates the release button 7 in wards, This action actuates the two engagement elements connected to the particular release button 7 to bow them further outwards and into the open configuration to release the engagement recess 12 to allow the male component 6 to no longer be obstructed from egress from the chassis 3. The lifting surface 18 of the tool 15 forces the squab 20 upwards from the surface 19 to remove the male component 6 from the chassis 3 and releasing the squab 20. As the tool 17 is removed from the chassis 3, the engagement elements nine return to the closed configuration. FIG. 12 shows a clip assembly 201 according to a further additional embodiment of the present invention. A female component 202 has a chassis 203 which is provided with a flange 204 for affixing the chassis 203 to a squab (not shown). Release buttons 207 are arranged about the female component 202 and, in this example, extend through the chassis 203 to allow actuation from a side of the assembly 201. A chassis opening 205 allows a male component 206 to be received in the chassis 203 of the female component 202. An affixing feature in the form of a groove formed in the flange 204 facilitates sewing of the flange 204 to a fabric covering of a squab to affix the female component to the squab.

Figure 13:
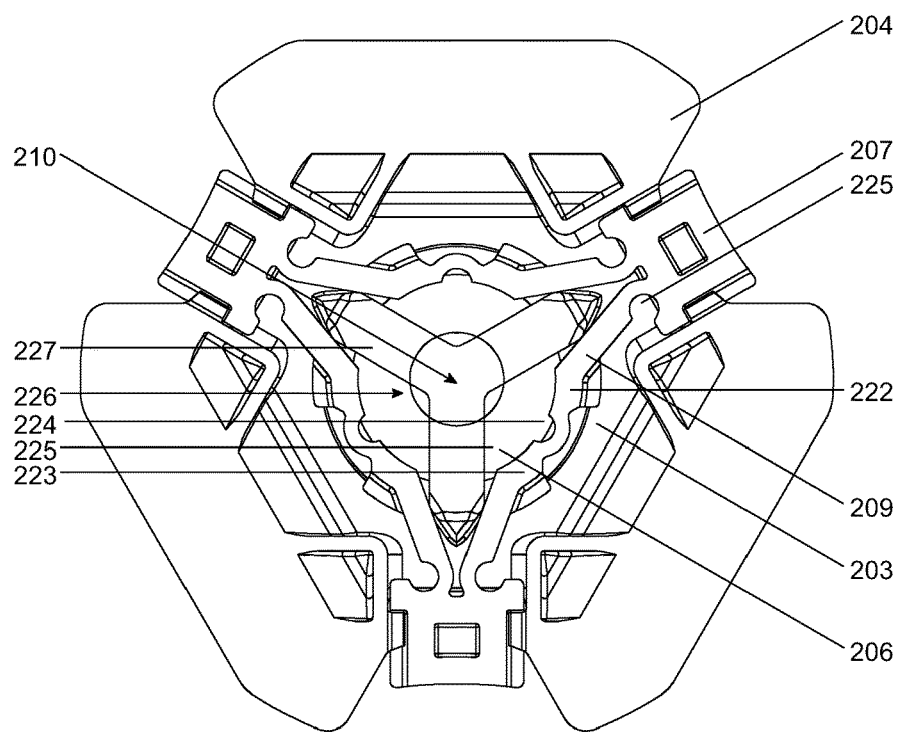
FIG. 13 shows an underside view of a clip assembly according to the further alternative embodiment of the present invention shown in FIG. 12.

FIG. 13 shows an underside view of the clip assembly of FIG. 12. In this embodiment, each engagement element 209 has two engagement sections 222 and 223 which form a radius 224 which is complementary to the radius of a male component 206 which engages a recess formed in the male component 206. The two sections 222 and 223 are bisected in this embodiment by a radius 225 which is operable to facilitate the engagement element 209 bowing outwards under actuation by one of the buttons 207. The engagement elements are each connected to two buttons 207. In this embodiment each of two engagement elements 209 connected to the same button are connected via the button rather than connected directly together. A radius 226 is formed in each engagement element close to the button 207 to facilitate flexing further to the radius 225.

FIG. 13 also shows a basket 226 formed of three arms 227 which extend between engagement elements 209 and attach to the chassis at a point proximate the chassis opening 205. The basket acts to centre the male component in the chassis. The arms of the basket also act to ensure that deformation of the engagement elements is outward towards a periphery of the chassis.

Figure 14:
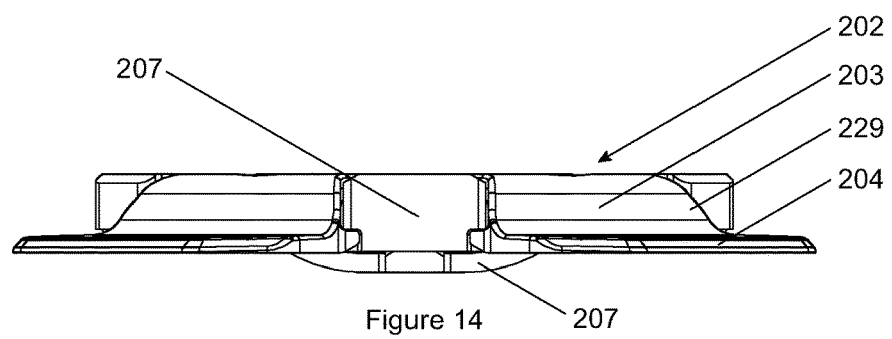
FIG. 14 shows a side view of a clip assembly of the same further alternative embodiment of FIG. 12 and FIG. 13.
Figure 15:
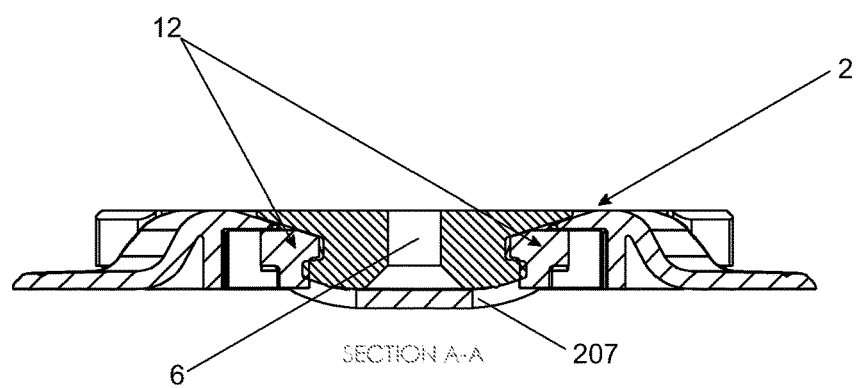
FIG. 15 shows a cut-away side view of a clip assembly of the same further alternative embodiment of FIGS. 12 to 14.
Figure 16:
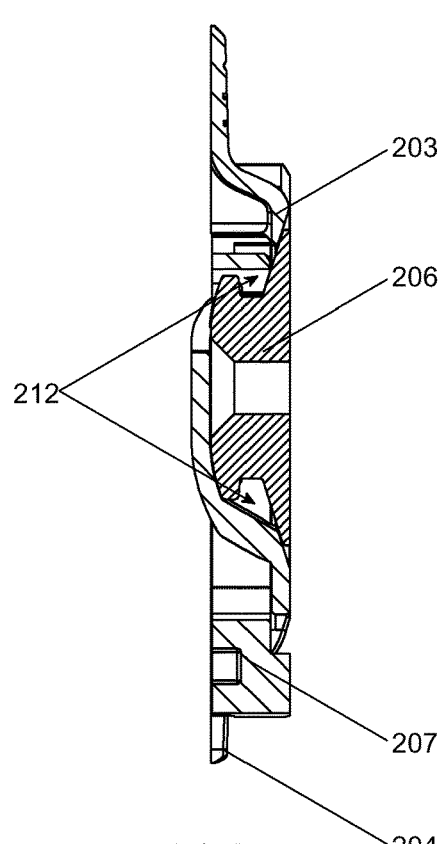
FIG. 16 shows another cut-away side view of a clip assembly of the same further alternative embodiment of FIGS. 12 to 15.

FIG. 14, FIG. 15 and FIG. 16 show the further additional embodiment of FIGS. 12 and 13 in side and cutaway views equivalent to FIG. 3, FIG. 4 and FIG. 5.

Figure 17:
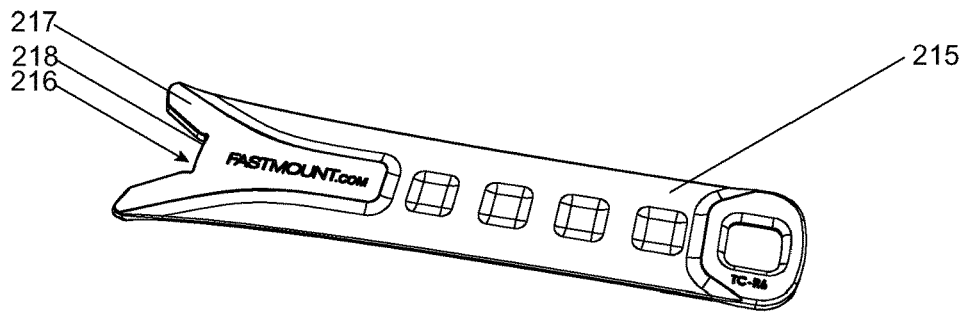
FIG. 17 shows perspective view of a tool used to release a squab according to the further alternative embodiment of FIGS. 12 to 16.
Figure 18:
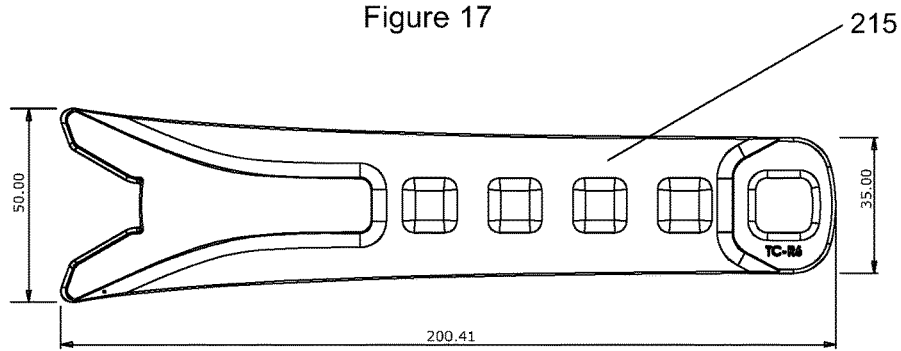
FIG. 18 shows a top view a tool used to release a squab according to the further alternative embodiment of FIGS. 12 to 17.
Figure 19:
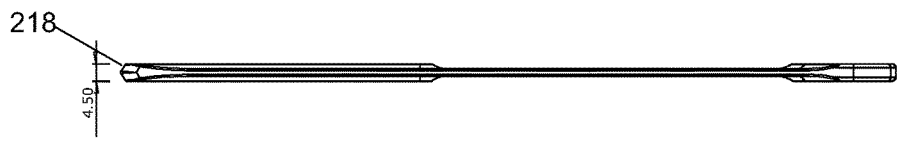
FIG. 19 shows a side view of a tool used to release a squab according to the further alternative embodiment of FIGS. 12 to 18.
Figure 20:
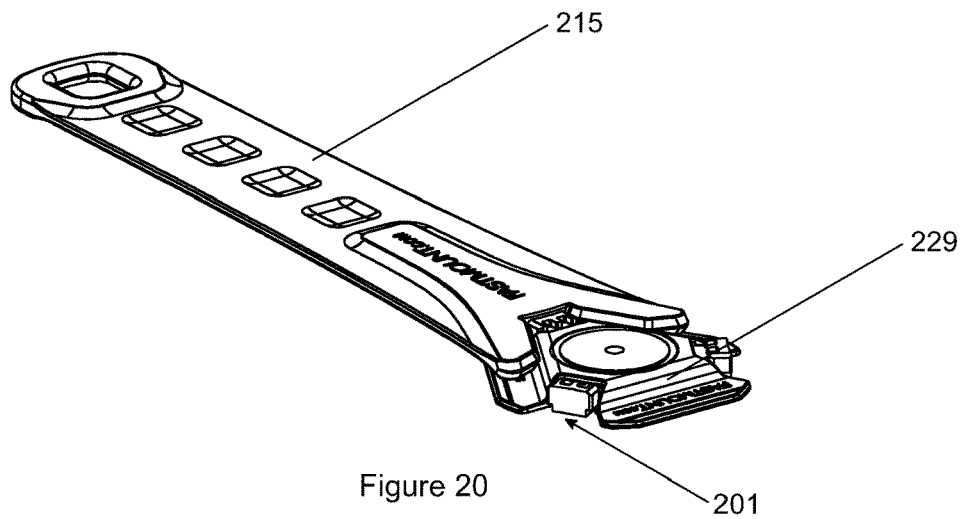
FIG. 20 shows a perspective view showing interaction between a tool and clip component of the same further additional embodiment of the present invention as FIGS. 12 to 19.

FIG. 17 shows a perspective view of a release tool 215 of the further additional embodiment of the present invention of FIG. 12 to FIG. 16. FIG. 18 shows a top view of the same release tool 215. As shown in a side view given by FIG. 19 the release tool 215 is flat. Also shown in FIG. 19 is a tapered leading edge 228 of the release tool. FIG. 20 shows the tapered edge 228 of the release tool engaging a recess 229 formed in the guide edge 221 of the chassis 203.

Figure 21:
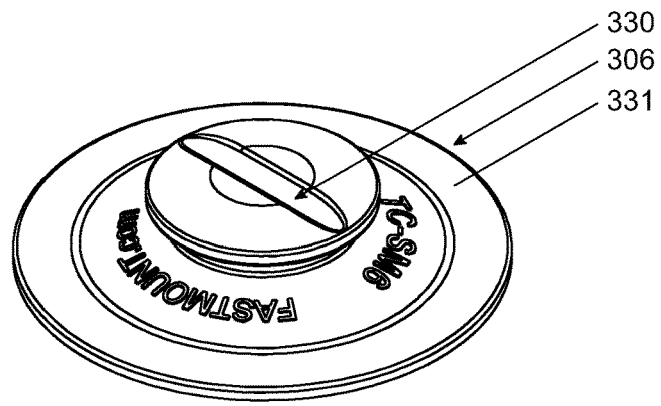
FIG. 21 shows a perspective view of a second, male part of a clip assembly according to an additional embodiment of the present invention.
Figure 22:
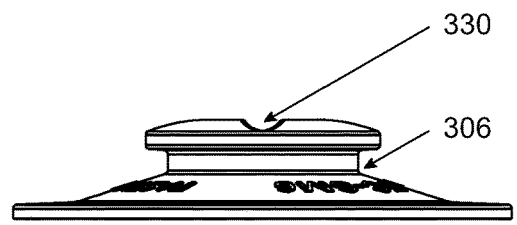
FIG. 22 shows a side view of a second, male part of a clip assembly according to the same embodiment of FIG. 21.

FIG. 21 shows a perspective view of a male component 306 of a clip assembly 301 according to an additional embodiment of the present invention. FIG. 22 shows a side view of a second, male part of FIG. 21. The male component 306 has a groove 330 to facilitate affixing the male component 306 by screwing to a stud, for example. An expanded flange 331 facilitates affixing the male component 306 to a supporting structure with an adhesive.

Figure 23:
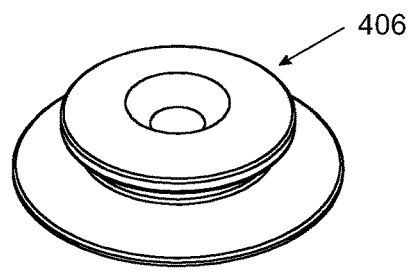
FIG. 23 shows a perspective view of a second, male part of a clip assembly according to another embodiment of the present invention.
Figure 24:
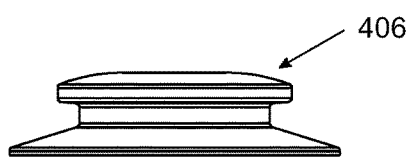
FIG. 24 shows a side view of a second, male part of a clip assembly according to the same embodiment of FIG. 23.

FIG. 23 shows a perspective view of a male component 406 of a clip assembly 401 according to another embodiment of the present invention. FIG. 24 shows a side view of the male component of FIG. 23.

Further and additional embodiments of the present invention will now be described.

In various embodiments of the present invention the clip is a lock in which male component is locked into the female component until it is released by action of a release button.

In some embodiments a flange provided for a male and/or female component is adapted for gluing to a squab, for example. In some embodiments a flange provided for a female component is adapted for sewing to the fabric of the squab. In some embodiments a flanged is adapted for both sewing and gluing.

In some embodiments a flange provided for a male and/or female component is adapted for gluing to a supporting surface, for example.

In some embodiments the chassis of the female component forms a housing for the male component.

Some embodiments may have tabs in place of flanges on one or more of the male or female components.

In alternative embodiments a deformable engagement element or set of elements is replaced by a movable engagement element set of elements. In various alternative embodiments the movable engagement elements are biased towards a configuration which engages the male component. In various alternative embodiments and bias element is provided to bias the engagement element.

In some embodiments engagement elements are formed integrally with release buttons or actuation elements. In some of these embodiments, the engagement elements and release buttons or actuation elements are formed of a single moulded component.

In alternative embodiments the female component is adapted to be affixed to a squab-mounting surface and the male component is adapted to be affixed to a squab. In some example embodiments a male component is provided with a flange.

In alternative embodiments a release element may comprise elements which only known to the reader as alternatives to actuating the engagement elements, and may comprise cams or threads for example.

In further alternative embodiments the release element may be operable to receive a force which is other than radial with respect to the central axis.

In other embodiments release elements are each attached to two engagement elements to couple the engagement elements together at an end of each engagement element. In some embodiments the release element is located in the chassis but able to move radially with respect to the centre of the chassis and chassis aperture. In some embodiments the release element locates a pair of ends of engagement elements while allowing them to deform and/or move outwards to an open configuration. In some embodiments the deformation and/or movement of the engagement elements is actuated by the release element in the form of a release button. In other embodiments the release element does not actuate the engagement elements but only allows them to deform and/or move by allowing a coupling of the engagement elements to move inwards while retaining them in the chassis. In some embodiments the engagement elements may be actuated by sufficient force on the male component.

In the preceding description and the following claims the word 'comprise' or equivalent variations thereof is used in an inclusive sense to specify the presence of the stated feature or features. This term does not preclude the presence or addition of further features in various embodiments.

In some embodiments of the present invention the engagement elements may be connected to a release element through another engagement element of through a section which is common to the engagement element and another engagement element.

In some embodiments the chassis opening may be wider than the male component by a tolerance suitable as known to the reader for approximately locating the male component with the chassis opening during a cushion securing operation. The male component is secured in the female component even for a tolerance of 10% or 20% of the male component diameter or more in some embodiments due to the flexible engagement elements. This tolerance facilitates rapid and easy securing of the male component in the female component or the cushion to a supporting surface. In some embodiments the engagement elements and release elements may be replaced to accommodate a male component of a different diameter.

In alternative embodiments the release elements may serve the purpose of locating the engagement elements with respect to or in the chassis. In some of these embodiments the release element will also allow the engagement elements to move so as to bow or deform into an open configuration. In an alternative embodiment the release element may comprise a bias element to bias the release element and/or engagement elements to given configurations.

It will be apparent to the reader that connection of the engagement elements serves to mechanically couple the engagement elements to the release element and/or one engagement element to another. Various embodiments may involve direct connection or indirect connection for the purpose of mechanical coupling.

In some embodiments the female component comprises two parts in the form of a chassis and a unitary part comprising the engagement elements and the release elements. In some embodiments the parts are formed by injection moulding.

In some embodiment the chassis may have a height in the axis in which the male component is received that is contracted. In some embodiments this height is a factor of the diameter of the chassis opening through which the male component is received. These embodiments provide a low profile clip for a cushion which is not likely felt by a person sitting on a cushion. These embodiments also provide a clip which is highly resistant to shearing forces such as caused by a person sliding in the cushion. In will be apparent to the reader that the flexible engagement elements, particularly in embodiments with three engagement elements, will flex to allow the chassis to bear shearing forces when a male component moves within the tolerance of the chassis opening.

Aspects of the present invention provide a clip assembly, the assembly comprising a female component having a shape which is contracted in a first axis, the female component operable to receive a male component in the first axis; one or more engagement elements operable to engage the received male component so as to provide push-through securement of the male component received by the female component; and one or more actuation elements each operable to receive an actuation force at a periphery of the female component and transverse to the first axis and operable to actuate one or more of the engagement elements so as to disengage from the male component to release the male component.

Embodiments of the present invention provide a clip assembly, the assembly comprising a female component operable to receive a male component in a first axis; one or more engagement elements operable to engage the received male component so as to provide push-through securement of the male component received by the female component; and one or more release elements each operable to move transverse to the first axis and operable to allow one or more of the engagement elements to move so as to disengage from the male component to release the male component.

The one or more release elements may be located in the chassis to locate the engagement elements.

Each release element may connect two engagement elements.

The one or more actuation elements may extend from the periphery of the female component.

The one or more actuation elements may extend from the periphery of the female component so as to receive an actuation force from an actuation tool with a concave part.

The one or more actuation elements may extend from the periphery of the female component so as to receive an actuation force from an actuation tool with a concave part to allow the tool to be self-guided to the actuation element as the tool is forced towards the female component.

Two or more engagement elements may each be connected to a common release element so that actuation of the release element allows deformation of the two or more engagement elements into the open configuration.

This aspect provides a low-profile clip which is suitable for placement between a squab and a squab-mounting surface and which is operable to receive a male component in push-through connection in a female component and which is operable to be released by actuation of an actuation element at a side of the clip, such as is readily performed by a tool slid between the squab and the squab-mounting surface.

One or more of the of the male or female part may be provided with one or more flanges which are suitable to be sewn to a fabric.

One or more of the of the male or female part may be provided with one or more flanges which are suitable to be glued to a fabric.

One or more of the of the male or female part may be provided with an aperture for a fixing element to secure the part to a substrate or supporting structure. The aperture may be suitable for a screw to secure the part to a substrate or supporting structure.

Embodiments of the present invention provide a clip assembly comprising a male component which is received in a chassis from a first direction relative to that chassis; one or more engagement elements operable to move to an open configuration to admit the male component and operable to return to a closed configuration to engage the male component to secure it in the chassis, and one or more release buttons operable when actuated transverse to the first direction to move the engagement elements to the open configuration to release the male component.

Embodiments of the present invention provide a clip assembly comprising a male component which is received in a chassis from a first direction relative to that chassis; one or more engagement elements operable to move to an open configuration to admit the male component and operable to return to a closed configuration to engage the male component to secure it in the chassis, and one or more release elements operable when actuated transverse to the first direction to allow the engagement elements to move to the open configuration to release the male component.

The one or more release element may comprise one or more buttons extending from the chassis to receive an actuation force external to the chassis. The clip assembly may comprise two or more engagement elements each connected to a common release button so that actuation of the button deforms the two or more engagement elements into the open configuration.

The one or more release buttons may be arranged so as to be capable of actuation from outside the chassis. This may allow the release buttons to be actuated at a side of the clip assembly to release the male component from the chassis.

The squab clip assembly may comprise three or more engagement elements each connecting two release buttons.

This clip assembly may comprise three release buttons and three engagement elements.

The release buttons may be located at positions spaced evenly about the chassis.

The engagement elements connected to the release buttons when in the closed configuration may define an opening which is smaller than that chassis opening. The opening defined by the engagement elements connected to the release buttons may be approximately triangle. Sides of the triangle maybe bowed outwards.

An engagement element may comprise a flexible element connected between two release buttons.

A flexible element may be arranged so as to bow towards a periphery of the chassis under deformation caused by actuation by a release button.

A flexible element may comprise a filament of material.

The button may be arranged to receive an actuation force at the side of the chassis to release the male component.

A flexible component may be resilient and arranged to bias towards the closed configuration while biasing the one or more buttons to return after actuation to an original position.

The chassis may define a chassis opening through which the chassis receives the male component.

The one or more flexible elements may be arranged to flex substantially transversely to the first direction.

The one or more flexible elements may obstruct part of the chassis opening by cutting off an arc of a periphery of the chassis opening when in the closed configuration.

The one or more flexible elements may be deformed under actuation one or more release buttons to move to a position where the chassis opening is not obstructed.

The male component may comprise one or more engagement recesses to receive the one or more engagement elements.

The flexible element may be arranged about the opening to obstruct egress of the male component from the chassis through the opening when the one or more flexible elements are in the in the closed configuration.

The male component may comprise a tapered leading end to allow the male component to cause the one or more flexible elements to flex as the male component is received into the through the opening in the chassis.

The tapered leading end and engagement elements may be arranged such that the male component is able to deform and/or move the engagement elements to force them into the open configuration such that the engagement elements does not obstruct ingress of the male component into the chassis.

This may provide a push-through and/or snap-lock connection of the male component to the female component.

The tapered leading end of the male component and engagement recesses may cooperate with the engagement elements to allow the male element to clip into the chassis and be secured until the one or more engagement elements are deformed by actuation by one or more buttons.

The one or more flexible elements may comprise a set of flexible elements connected to a corresponding set of buttons such than actuation of a button deforms two or more flexible elements transverse to the opening in the chassis. Actuation of a button may release the male component.

The one or more buttons may extend through the chassis to be exposed at a side of the chassis.

The clip assembly may comprise buttons located at regular intervals about the chassis to allow different buttons to be actuated from different directions.

The one or more flexible elements may be connected to buttons extending through the chassis and dimensioned relative to the chassis such that the flexible elements are in a flexed state when in the closed configuration. This may cause actuation of a button and flexing of the one or more elements to be outwards relative to the opening in the chassis.

The clip assembly may comprise a flange connected to the chassis and operable to be affixed to a squab to affix the chassis to the squab.

The clip assembly may comprise a flange connected to the male component and operable to be affixed to a squab to affix the male component to the squab.

The flange may be arranged suitable to be affixed to a squab by sewing.

The flange may have formed therein one or more tracks of material sufficiently thin to facilitate sewing through the track.

The flange may be arranged suitable to be affixed to a squab by gluing.

The flanged may have formed therein one or more tracks operable to receive an adhesive compound so as to facilitate adhering of the flange.

The flanged may have forms therein one or more tracks of material sufficiently thin to facilitate sewing through the track.

Embodiments of the present invention may provide a tool operable to release the male component from the chassis, the tool comprising an actuation surface operable to actuate a release button of the clip assembly when the tool is forced towards the chassis; guide arms extending outwards relative to the actuation surface to engage the chassis and align the actuation surface with the chassis so as to contact a button.

The tool may comprise an inclined surface operable to apply force a squab connected using the squab clip assembly in the first direction as the tool is pushed towards the clip assembly.

Embodiments of the present invention may provide a clip assembly comprising a housing defining an opening to receive a male component; one or more engagement elements operable to engage a male component received in the housing, and one or more actuation elements operable to receive an actuation force at a side of the housing and to deform and/or move one or more of the one or more engagement elements into a configuration in which the opening is not obstructed, wherein the engagement elements are operable to be deformed and/or moved by action of the male component entering the housing so as to provide snap-like securement of the male component in the housing, and wherein the engagement elements are operable disengage from the male component under actuation by the one or more actuation elements.

This allows snap-lock connection of male component in the housing and release of the male component by providing an actuation force at a side of the housing. This may provide a snap-lock with a low profile.

Embodiments of the present invention provide a clip assembly comprising a male component which is received in a chassis from a first direction relative to that chassis; one or more engagement elements operable to deform to an open configuration to admit the male component and operable to return to a closed configuration engage the male component to secure it in the chassis, and one or more release elements each connected to one or more engagement elements and operable when actuated transverse the first direction to allow the engagement elements to deform and/or move the flexible elements to the open configuration to release the male component, wherein the release elements mount the engagement elements while allowing the engagement elements to deform and/or move between open and closed configurations.

The engagement element may be resilient so as to be biased towards the closed configuration.

Embodiments of the present invention provide a clip assembly comprising a male component which is received in chassis from a first direction relative to that chassis; one or more engagement elements operable to move and/or deform to an open configuration to admit the male component and operable to return to a closed configuration engage the male component to secure it in the chassis, and one or more release elements operable to connect adjacent engagement elements to each other and to locate the engagement elements and operable to move transverse to the first direction to allow the connected engagement elements to deform and/or move to the open configuration to release the male component.

The clip assembly may comprise an enjoyment elements and actuation elements formed integrally. The clip assembly may comprise three engagement elements connected by actuation elements. The clip assembly may comprise release elements and actuation elements formed integrally.

As used here in the term 'push-through' is intended to refer broadly to types of connectors or clips in which a first component is pushed into a second component to push through or past an element which subsequently secures the first component to the second component, and includes connectors or clips where the element is deformed or is movable and biased into a position which secures the first component.

As used herein the term 'snap-lock' is intended to refer broadly to types of connectors or clips involving an element which moves and/or deforms and snaps back into position to lock one component of the connector or clip to another.

As used here in the term 'contracted' is intended to refer broadly to shapes which are shorter in a first axis than they are wide as measured transverse to the first axis, such as disk-like shapes being not limited to having a circular periphery.

It is to be understood that the present invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention as defined in the appended claims.

What is claimed is:

1. A releasable clip assembly operable to secure a cushion to a supporting surface, the assembly comprising:
    a male component which is received in a first axis in a chassis of a female component;
    the female component comprising a plurality of engagement elements configurable into an open configuration to admit the male component and operable to return to a closed configuration to engage the received male component to secure it in the chassis, said plurality of engagement elements being located at positions spaced evenly about the chassis of the female component, and
    a plurality of release elements operable when actuated transversely to the first axis to allow the engagement elements to be configured in the open configuration to release the male component,
    wherein each of said plurality of engagement elements is connected to two release elements such that the actuation of either of the two release elements allows movement of a corresponding engagement element into the open configuration.

2. The clip assembly of claim 1 wherein two of said plurality of engagement elements are each connected to a common release element of said plurality of release elements such that actuation of the common release element allows movement of the two engagement elements connected to the common release element into the open configuration.

3. The clip assembly of claim 1 wherein the plurality of release elements extend from the chassis to receive an actuation force external to the chassis.

4. The clip assembly of claim 3 wherein each of the plurality of engagement elements comprises a flexible element connected between two of said plurality of release elements so as to be configurable into the open configuration by bowing towards a periphery of the chassis under actuation of at least one of the plurality of release elements connected to the flexible element.

5. The clip assembly of claim 4 wherein the flexible element is resilient and biased towards the closed configuration to bias the release elements connected to the flexible element to return after actuation to an original position.

6. The clip assembly of claim 4 wherein the male component comprises a tapered leading end to allow the male component to cause the one or more flexible elements to flex to the open configuration as the male component is received into a chassis opening to provide a push through connection of the male component.

7. The clip assembly of claim 1 wherein each of the plurality of release elements comprises a button which is operable to be actuated by a digit of a hand.

8. The clip assembly of claim 7 wherein said plurality of release elements comprises three release elements and said plurality of engagement elements comprises three engagement elements.

9. The clip assembly of claim 1 wherein said plurality of release elements are operable to locate the engagement elements with respect to the chassis.

10. The clip assembly of claim 9 wherein the male component is received in the chassis of a female component through a chassis opening and wherein said plurality of engagement elements in the closed configuration partially obstruct the chassis opening to define a partially obstructed opening which is narrower than that the chassis opening.

11. The clip assembly of claim 10 wherein the chassis of the female component is shorter in the first axis than a diameter of the chassis opening.

12. The clip assembly of claim 11 wherein the male component comprises one or more engagement recesses to receive the plurality of engagement elements when the plurality of engagement elements are in the closed configuration.

13. The clip assembly of claim 1 comprising a flange connected to the chassis the flange operable to be affixed to a cushion to affix the chassis to the cushion.

14. The clip assembly of claim 1 comprising a flange connected to the male component and operable to be affixed to a squab to affix the male component to the squab.

\* \* \* \* \*

UNITED STATES PATENT AND TRADEMARK OFFICE
CERTIFICATE OF CORRECTION

PATENT NO. : 10,051,974 B2   Page 1 of 1
APPLICATION NO. : 15/299049
DATED : August 21, 2018
INVENTOR(S) : Gregory John Kelly It is certified that error appears in the above-identified patent and that said Letters Patent is hereby corrected as shown below:

On the Title Page

"(12) United States Patent
       Gregory"
Should be changed to:
--(12) United States Patent
       Kelly--.

"(72) Inventor: John Kelly Gregory, Waimauku (NZ)"
Should be changed to:
--(72) Inventor: Gregory John Kelly, Waimauku (NZ)--.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*